United States Patent [19]

Conrad et al.

[11] Patent Number: 4,460,900
[45] Date of Patent: Jul. 17, 1984

[54] DEVICE FOR MOUNTING AN ANTENNA ELEMENT ON AN ANTENNA SUPPORTING SPAR

[75] Inventors: Helmut Conrad, Hamburg, Fed. Rep. of Germany; Reinhard Schmidt, Heidacker 52, 2000 Hamburg 54, Fed. Rep. of Germany

[73] Assignee: Reinhard Schmidt, Hamburg, Fed. Rep. of Germany

[21] Appl. No.: 302,071

[22] Filed: Sep. 14, 1981

[30] Foreign Application Priority Data

Sep. 23, 1980 [DE] Fed. Rep. of Germany ....... 3035818

[51] Int. Cl.³ .............................................. H01Q 1/12
[52] U.S. Cl. .................................................. 343/880
[58] Field of Search ............... 343/815, 817, 818, 819, 343/880, 915

[56] References Cited

FOREIGN PATENT DOCUMENTS 1303879 12/1973 Fed. Rep. of Germany .
2065276 9/1974 Fed. Rep. of Germany .
1362625 3/1963 France ................................ 343/817
2108769 5/1972 France .
2124091 9/1972 France .
107174 7/1974 German Democratic Rep. .
829412 3/1960 United Kingdom ................ 343/815
1343651 1/1974 United Kingdom .

Primary Examiner—Eli Lieberman
Attorney, Agent, or Firm—Murray, Whisenhunt and Ferguson

[57] ABSTRACT

There is provided a device for fastening a rod-like antenna element on an antenna supporting spar having a square or rectangular cross-section which device comprises a U-shaped clamp of spring elastic material having inclined portions at the free ends of the legs which portions extend in the direction of the base of the clamp. Adjacent to the base of the clamp, essentially aligning holes are provided in the legs for inserting an antenna element. In the non-deformed stage of the clamp a deformed portion of the base extends in the linear connection of the holes whereas the antenna element can be inserted into the holes when the legs of the clamp are pressed together.

11 Claims, 4 Drawing Figures

DEVICE FOR MOUNTING AN ANTENNA ELEMENT ON AN ANTENNA SUPPORTING SPAR

The invention relates to a device for mounting a rod-like antenna element on an antenna supporting spar having a square or rectangular cross-section, which device is in general used for television and/or radio antennas, for amateur radio antennas and for Yagi antennas.

BACKGROUND OF THE INVENTION

Upto now rod-like antenna elements have been mounted on an antenna supporting spar by drilling holes through such spar, inserting the antenna element into such holes, adjusting the position of the antenna element in relation to the spar and securing the antenna element by means of fastening elements, e.g. by using splints extending through corresponding holes in the antenna element. Such mounting results in a reduction of the structural strength of the antenna supporting spar and requires a considerable amount of work for machining and assembling. Further it is difficult to obtain an exact adjustment of the antenna element in relation to the antenna supporting spar.

It is also known to mount antenna elements on the antenna supporting spar by means of pivotable connections which enable a certain prefabrication. At the place of use, the antenna elements will be pivoted to a perpendicular position in relation to the antenna supporting spar. However, such way of mounting requires complicated and expensive connection means and in most cases a separate connection means is required for each antenna element provided at one side of the antenna supporting spar.

OBJECTS OF THE INVENTION

It is therefore an object of the invention to provide a simple and reliable device for mounting rod-like antenna elements on an antenna supporting spar having a square or rectangular cross-section.

It is further an object of the invention to provide a device permitting mounting of an antenna element on an antenna supporting spar in a simple way and permitting an exact adjustment of the position of the antenna element in relation to the antenna supporting boom.

BRIEF DESCRIPTION OF THE INVENTION

Briefly stated the invention is a device for mounting antenna elements on an antenna supporting spar which device comprises a U-shaped clamp of spring elastic material, which clamp is provided with two inclined portions at the free ends of its legs, such portions being inclined inwardly and directed to the base of the clamp. Such inclined portions grip in the surface of the antenna supporting spar thereby fixing the position of such clamp relative to the antenna supporting spar.

The clamp is provided with two holes in its legs adjacent to the base of the clamp into which holes an antenna element can be inserted. The base of the clamp is deformed in general in parallel to the legs and downwardly so that the deformed portion at least partially interrupts the linear connection of the holes when the clamp is not deformed, whereas the deformed portion of the base does not extend in the area of the linear connection of the two holes when the legs of the clamp are pushed together for a predetermined distance.

To insert the antenna element into the holes of the clamp the legs have to be pushed together whereby the deformed portion of the base is moved upwardly and out of the area of the linear connection of the two holes so that the antenna element can be inserted and brought in any position desired in relation to the clamp. By releasing the legs the deformed portion of the base moves downwardly again and locks the antenna element in its position by contacting the antenna element and pressing it downwardly. Such locking force is maintained when the clamp carrying the antenna element is mounted on the antenna supporting spar since during such mounting operation the legs will not be pressed together but additionally expanded so that the antenna element is held in its position during and after mounting of clamp on the antenna supporting spar.

To obtain a stable and reliable connection of the clamp and the antenna supporting spar, the distance between the free ends of the inclined portions and the lower edges of the holes can be slightly smaller than the height of the antenna supporting spar. Thereby the inclined portions at the free ends of the legs will be deformed elastically when the clamp is mounted on the antenna supporting spar so that such inclined portions are forced against or into the material of the antenna supporting spar.

Preferably the clamp consists of spring steel, e.g. stainless steel like X 12 CrNi 17 7, i.e. a steel comprising less than 0.15% C, less than 1.0% Si, less than 2.0% Mn, 17.0% Cr and 7.5% Ni. Such steel will be brought in the shape of the clamp by cold forming and the spring properties are generated by heat-treatment of the clamp at 350° C.

DETAILED DESCRIPTION OF THE INVENTION

Figure 1:
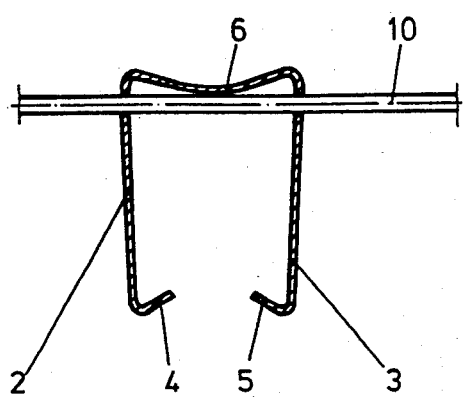
FIG. 1 is a cross-section of a clamp according to the invention with an antenna element inserted.

The clamp 1 shown in the figures is a U-shaped clamp, comprising a base 6 and two legs 2,3. At the free ends of the legs 2,3 inclined portions 4, 5 are provided which are bent inwardly and directed to the base 6. Adjacent to base 6 holes are provided in legs 2, 3, one of these holes 7 can be recognized in FIG. 2. Such holes are used for inserting a rod-like antenna element and therefore the dimensions of the holes are adapted to the dimensions of the antenna element. As shown base 6 of clamp 1 is deformed inwardly, i.e. it is bent in the direction of the free ends of legs 2,3 forming an indentation extending in parallel to such legs. However, such deformation may, for instance, consist of a corrugation with a remaining plane portion of the base.

Clamp 1 is formed in one piece and consists preferably of spring steel.

Figure 2:
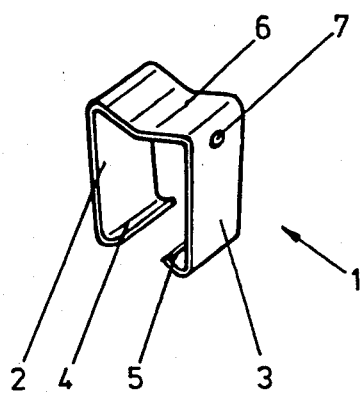
FIG. 2 is a perspective view of a clamp according to the invention.

As shown in FIG. 1, clamp 1 is used for holding a rod-like antenna element 10 which is inserted in the holes of legs 2, 3 with only one hole 7 shown in FIG. 2. However, such insertion cannot occur as long as the clamp is in a non-deformed stage as shown in FIG. 2 since the deformed portion of base 6 extends inwardly in direction of inclined portions 4,5 and in the area of the linear connection of the holes in the legs. If, therefore, antenna element 10 has been inserted in one of the holes the deformed portion of bases 6 will block insertion of the antenna element into the opposite hole. To permit complete insertion of the antenna element 10, legs 2,3 have to be pressed together for a certain distance thereby moving the linear connection of both holes out of the area of the deformed portion of base 6, so that the antenna element can be inserted into both holes. After complete insertion of antenna element 10 into the holes and exact adjustment in relation to clamp 1, legs 2,3 are released and the antenna element will be pressed against the lower edges of the holes and the deformed portion of bases 6 and will therefore be locked in its position (FIG. 1). Therefore the combination of clamp and antenna element can be transported to the location of final antenna assembly without any danger of change of position of the antenna element in relation to the clamp.

Figure 3:
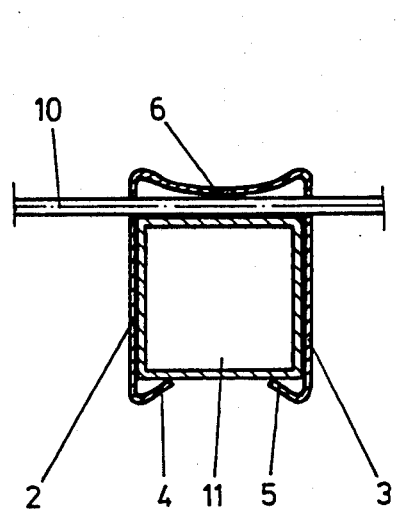
FIG. 3 is a cross-section of a clamp according to the invention mounted on an antenna supporting spar together with an antenna element.
Figure 4:
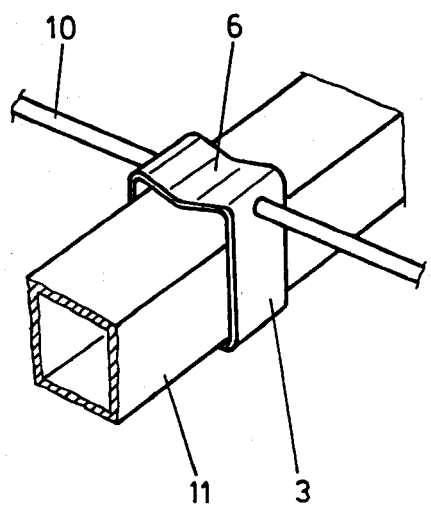
FIG. 4 is a perspective view of a clamp according to the invention mounted on the antenna supporting spar with an antenna element inserted.

To mount the combination of clamp 1 and antenna element 10 on the antenna supporting spar which in the embodiment shown consists of a rectangular tube 11, e.g. of aluminum the opening formed by legs 2, 3 will be widened which results in an even tighter locking of the antenna element. The legs opened up will then be pushed onto the antenna supporting spar 11, so that in the final position the inclined portions 4, 5 will rest against the lower surface of antenna supporting spar 11 as shown in FIG. 3. Since the distance between the lower surface of antenna element 10 and the free ends of inclined portions 4,5 is preferably slightly smaller than the height of antenna supporting spar 11 the inclined portions 4,5 will be elastically deformed and will thereby draw downwardly clamp 1 including antenna element 10 against the antenna supporting spar. Further, the inclined portion 4, 5 are pressed against or into the lower surface of the antenna supporting spar 11. Therefore, a safe and reliable connection between clamp 1 and antenna supporting spar 11 is obtained without any additional fastening means, e.g. screws.

What is claimed is:

1. A device for mounting a rod-like antenna element on an antenna supporting spar, the device comprising:
   a generally U-shaped clamp comprising a base and two depending legs;
   said legs at their free ends, are provided with means for clampingly pressing against or into said supporting spar;
   said legs, adjacent to said base, are provided with means defining an aperture receivably engageable of a rod-like antenna element in substantially parallel relationship to said base; and
   said base provided with means for preventing movement of said antenna element through said means defining an aperture, when said legs are not pressed towards one another and allowing movement of said antenna element through said means defining an aperture, when said legs are pressed towards one another for a predetermined distance.

2. The device as claimed in claim 1, wherein said generally U-shaped clamp is of spring elastic material.

3. The device as claimed in claim 1, wherein said means for clampingly pressing against or into said supporting spar comprise inclined portions of the legs bent inwardly and directed to the base of said clamp.

4. The device as claimed in claim 1, wherein said means defining an aperture receivably engageable of a rod-like antenna element in substantially parallel relationship to said base comprises a hole through said leg.

5. The device as claimed in claim 1, wherein said means for preventing movement of said antenna element through said means defining an aperture, when said legs are not pressed towards one another, and allowing movement of said antenna element through said means defining an aperture, when said legs are pressed towards one another for a predetermined distance, comprise a deformation of the base extending downwardly in the direction of the free ends of the legs which deformation extends in parallel to said legs and downwardly at least partially in the area of linear connection of said means defining an aperture in said legs, when said legs are not pressed toward one another, and which deformation is out of the area of said linear connection, when said legs are pressed towards one another for a predetermined distance.

6. The device as claimed in claim 1, wherein said device comprises:
   a generally U-shaped clamp of spring elastic material, comprising a base and two depending legs;
   said legs, at their free ends, having inclined portions of the legs bent inwardly and directed to the base of said clamp which are pressingly clampable against or into said supporting bar;
   said legs, adjacent to said base, having a hole therethrough engageably receivable of a rod-like antenna element in substantially parallel relationship to said base; and
   said base having a deformation extending downwardly in the direction of the free ends of the legs which deformation extends in parallel to said legs and downwardly at least partially in the area of linear connection of said holes in said legs, when said legs are not pressed towards one another, and which deformation is out of the area of said linear connection, when said legs are pressed toward one another for a predetermined distance.

7. The device as claimed in claim 6, wherein the distance between the free ends of said inclined portion of the legs and the lower edges of said holes is slightly smaller than the height of said antenna supporting spar.

8. The device as claimed in claim 1, wherein said legs, at their free ends, are provided with means for clampingly pressing against or into a support spar of square or rectangular crossection.

9. The device as claimed in claim 1, wherein said legs, adjacent to said base, are provided with means defining an aperture receivably engageable of a rod-like antenna element for a television, radio, amateur radio or Yagi antenna, in substantially parallel relationship to said base.

10. The device as claimed in claim 1, wherein said clamp consists of spring steel.

11. The device as claimed in claim 10, wherein said spring steel is a stainless, acid-resistant steel.

* * * * *